US008955647B2

(12) United States Patent
Sie et al.

(10) Patent No.: US 8,955,647 B2
(45) Date of Patent: Feb. 17, 2015

(54) POWER GENERATING APPARATUS

(76) Inventors: Shuci-Tian Sie, Kaohsiung (TW);
Kai-Jun Sie, Kaohsiung (TW); Kai-Fu Sie, Kaohsiung (TW)

( * ) Notice: Subject to any disclaimer, the term of this patent is extended or adjusted under 35 U.S.C. 154(b) by 372 days.

(21) Appl. No.: 13/474,118

(22) Filed: May 17, 2012

(65) Prior Publication Data

US 2012/0312106 A1 Dec. 13, 2012

(30) Foreign Application Priority Data

Jun. 13, 2011 (TW) .............................. 100210642 U

(51) Int. Cl.
*F03G 3/00* (2006.01)

(52) U.S. Cl.
USPC ........................................................... 185/30

(58) Field of Classification Search
CPC ........... F03G 3/00; F03G 7/08; F03B 13/186; F03B 13/1815
USPC ........ 185/27, 29, 30; 290/42, 53; 60/497–507
See application file for complete search history.

(56) References Cited

U.S. PATENT DOCUMENTS

| 4,599,858 | A * | 7/1986 | La Stella et al. ................. 60/497 |
| 7,043,904 | B2 * | 5/2006 | Newman .......................... 60/398 |
| 2003/0030883 | A1* | 2/2003 | Giri et al. ........................ 359/265 |
| 2013/0056988 | A1* | 3/2013 | Hunt et al. ....................... 290/53 |

FOREIGN PATENT DOCUMENTS

| GB | 2065983 A * | 7/1981 |
| TW | M249897 | 11/2004 |
| TW | M381681 | 6/2010 |
| TW | I343321 | 6/2011 |

* cited by examiner

*Primary Examiner* — Phillip A Johnson
(74) *Attorney, Agent, or Firm* — Jackso IPG PLLC

(57) ABSTRACT

A power generating apparatus enables a power generating module to generate electric power via reciprocal movement of a transmission module. The transmission module at least includes a transmission rod and a counterweight block. The power generating module includes a supporting rack, a rotation shaft, a one-way rotating gear, a first gear, a second gear and a generator. The rotation shaft is pivotally disposed at the supporting rack, the one-way rotating gear and the first gear are coupled to the rotation shaft, the one-way rotating gear is engaged with the transmission rod, the second gear is coupled to the generator, and the second gear is engaged with the first gear. An elastic member can push forward the transmission module, and the transmission module is reciprocally movable by gravity and reacting force of the elastic member.

28 Claims, 7 Drawing Sheets

POWER GENERATING APPARATUS

FIELD OF THE INVENTION

The present invention is generally related to a power generating apparatus, which particularly relates to the power generating apparatus with higher effectiveness of power generation.

BACKGROUND OF THE INVENTION

Please refer to Taiwan patent publication No. M381681 "Seesaw type water wave electric generator", which including a first float, a second float, power generation assembly, a first connection pipe and a second connection pipe. The second float and the first float are spaced apart from each other, and the second float is disposed at one side of the first float. The power generation assembly is disposed between the first float and the second float. One end of the first connection pipe is in communication with the first float, and another end of the first connection pipe is in communication with the power generation assembly. One end of the second connection pipe is in communication with the second float, and another end of the second connection pipe is in communication with the power generation assembly. A liquid is injected into the first float and the second float. The liquid reciprocally flows within the first connection pipe and the second connection pipe through wave motions of sea water. The reciprocal flowing liquid may actuate the power generating assembly to generate electric power. For the reason that the liquid is injected into the first float and the second float, besides, the liquid must flow within the first float and the second float to actuate the power generation assembly. Therefore, the effectiveness of power generation for seesaw type water wave electric generator is relatively poor.

SUMMARY

The primary object of the present invention is to overcome a relative low effectiveness of power generation in the prior arts. The power generating apparatus of the present invention includes a transmission module, a power generating module, an elastic member and a case, wherein the transmission module, the power generating module and the elastic member are disposed at an accommodating chamber of the case. The transmission module at least includes a transmission rod and a counterweight block, and the counterweight block is coupled to the transmission rod. The power generating module includes a supporting rack, a rotation shaft, a one-way rotating gear, a first gear, a second gear and a generator. The rotation shaft is pivotally disposed at the supporting rack, the one-way rotating gear and the first gear are coupled to the rotation shaft, the one-way rotating gear is engaged with the transmission rod, the second gear is coupled to the generator, and the second gear is engaged with the first gear. The elastic member can push forward the transmission module so that the transmission module can be reciprocally movable via gravity and reacting force of the elastic member to enable the power generating module to generate electric power. The present invention possesses a feature of higher effectiveness of power generation compared with prior arts.

DETAILED DESCRIPTION OF THE INVENTION

Figure 1:
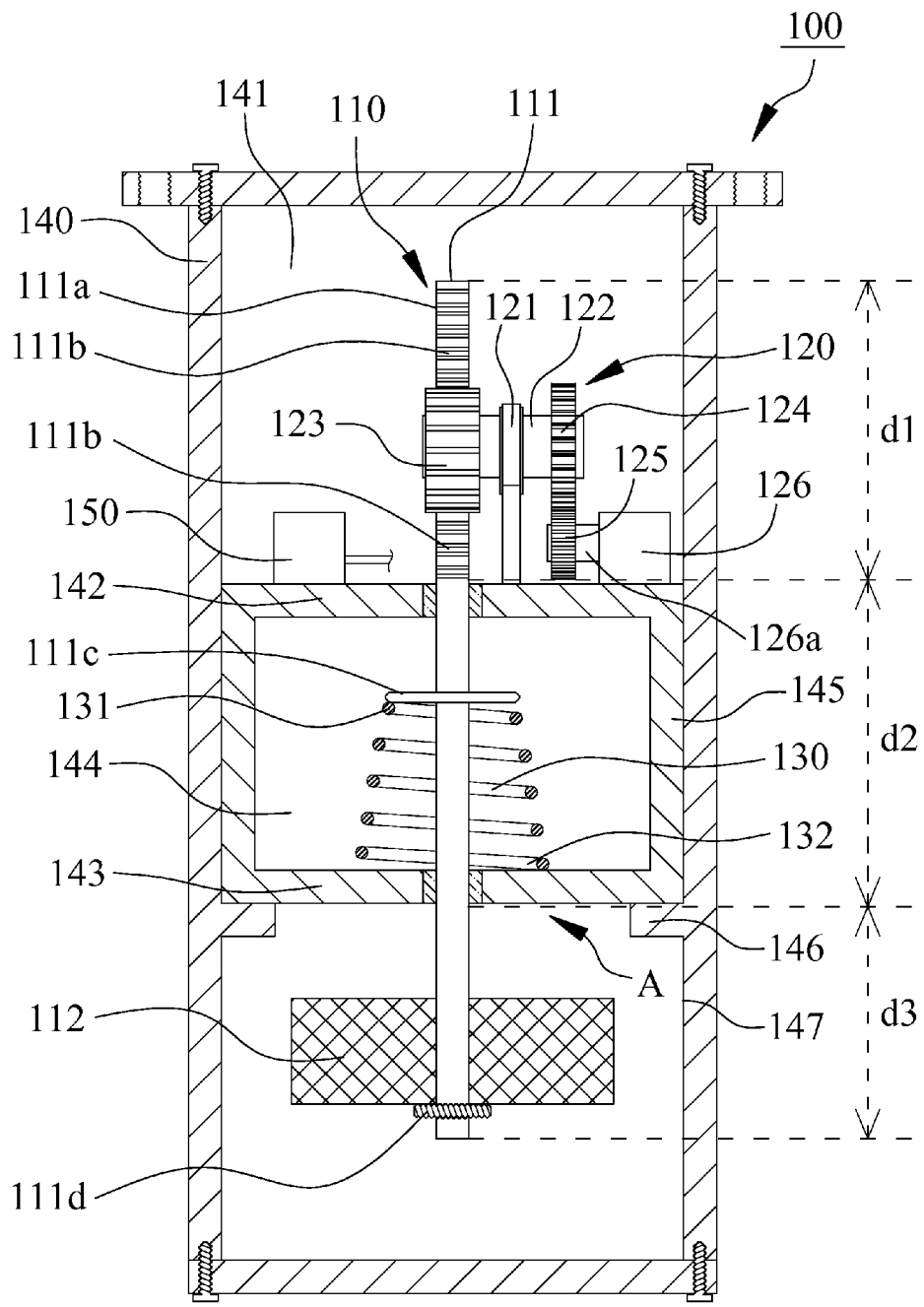
FIG. 1 is a section view illustrating a power generating apparatus in accordance with a first embodiment of the present invention.
Figure 2:
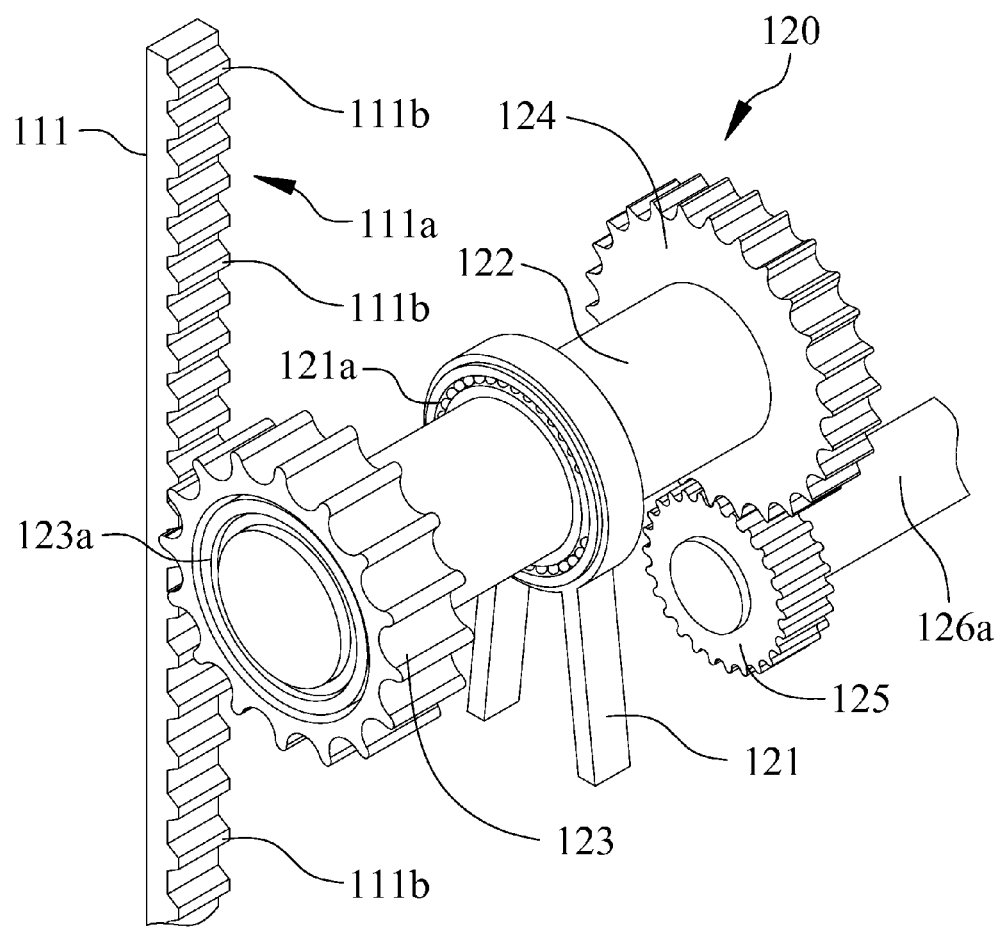
FIG. 2 is a partial assembly diagram illustrating a transmission module and a power generating module of the power generating apparatus in accordance with a first embodiment of the present invention.

With reference to FIG. 1, a power generating apparatus 100 in accordance with a preferred embodiment of the present invention includes a transmission module 110, a power generating module 120, an elastic member 130 and a case 140. The transmission module 110 at least includes a transmission rod 111 and a counterweight block 112, wherein the counterweight block 112 is coupled to the transmission rod 111. Or, the counterweight block 112 and the transmission rod 111 are formed as one piece. The power generating module 120 includes a supporting rack 121, a rotation shaft 122, a one-way rotating gear 123, a first gear 124, a second gear 125 and a generator 126, wherein the rotation shaft 122 is pivotally disposed at the supporting rack 121. With reference to FIGS. 1 and 2, preferably, the supporting rack 121 comprises a bearing 121a, and the rotation shaft 122 is pivotally disposed at the bearing 121a. The rotation shaft 122 is able to rotate in clockwise direction or counterclockwise direction via the bearing 121a. The one-way rotating gear 123 and the first gear 124 are coupled to the rotation shaft 122, wherein the rotation shaft 122, the one-way rotating gear 123 and the first gear 124 can rotate simultaneously. In this embodiment, the one-way rotating gear 123 is coupled to one end of the rotation shaft 122, and the first gear 124 is coupled to another end of the rotation shaft 122. The one-way rotating gear 123 and the first gear 124 are located at two sides of the supporting rack 121. The one-way rotating gear 123 is engaged with the transmission rod 111 and includes a one-way rotating bearing 123a (As disclosed in Taiwan patent publication No. M249897). Or, the one-way rotating gear 123 can be a single-direction rotational structure (ratch and fastener are included) as disclosed in Taiwan patent application No. 097144398. The transmission rod 111 comprises a rack portion 111a having a plurality of teeth 111b, the teeth 111b are engaged with the one-way rotating gear 123, the second gear 125 is coupled to the generator 126. In this embodiment, the generator 126 comprises an actuation shaft 126a, the second gear 125 is coupled to the actuation shaft 126a of the generator 126 and engages with the first gear 124, and the elastic member 130 can push forward the transmission module 110. Referring to FIG. 1, the elastic member 130 comprises a first end portion 131 and a second end portion 132, the first end portion 131 is in contact against the transmission rod 111, and the second end portion 132 is in contact against the case 140. In this embodiment, the transmission rod 111 comprises a blocking member 111c, and the first end portion 131 of the elastic member 130 is in contact against the blocking member 111c.

The case 140 comprises an accommodating chamber 141, wherein the transmission module 110, the power generating module 120 and the elastic member 130 are disposed within the accommodating chamber 141. In this embodiment, the case 140 includes a first plate 142 and a second plate 143, the first plate 142 and the second plate 143 are located within the accommodating chamber 141, wherein the first plate 142 and the second plate 143 are spaced apart to form an accommodating space 144, and the elastic member 130 is disposed at the accommodating space 144. The second end portion 132 of the elastic member 130 is in contact with the second plate 143, and the power generating module 120 is disposed at the first plate 142. With reference to FIG. 1, in this embodiment, the case 140 further includes a frame 145 and a protrusion 146, the frame 145 is coupled to the first plate 142 and the second plate 143 to form a supporting frame A, and the protrusion 146 is protruded to an inner surface 147 of the case 140. The supporting frame A is disposed at the protrusion 146, that is to say, the second plate 143 is disposed at the protrusion 146.

Figure 3:
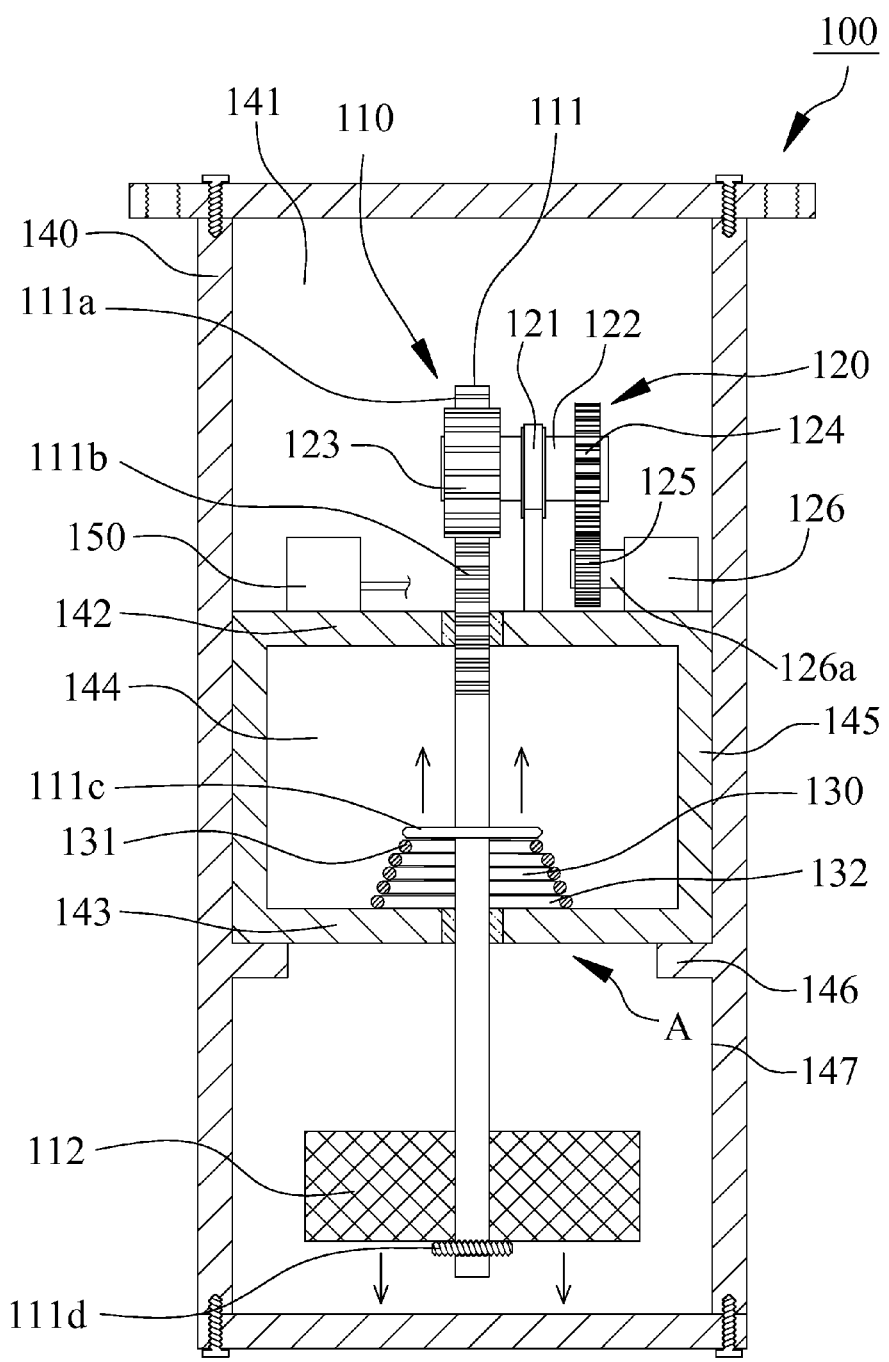
FIG. 3 is an action diagram illustrating the power generating apparatus in accordance with a first embodiment of the present invention.

With reference to FIGS. 1 and 3, the transmission rod 111 is penetrated through the first plate 142 and the second plate 143, the transmission rod 111 comprises a first section d1, a second section d2 and a third section d3, and the second section d2 is located between the first section d1 and the third section d3. In this embodiment, the rack portion 111a is disposed at the first section d1, and the rack portion 111a of the transmission rod 111 is located on top of the first plate 142. The transmission rod 111 further comprises a limiting member 111d, and the limiting member 111d bears the counterweight block 112.

With reference to FIG. 3, when the power generating apparatus 100 vibrates from external forces, the transmission rod 111 and the counterweight block 112 of the transmission module 110 are affected to move downwardly from gravity. In the mean time, the one-way rotating gear 123 starts rotation actuated by the transmission rod 111 and the one-way rotating gear 123 drives the rotation shaft 122 and the first gear 124 to start rotation as well. For the reason that the second gear 125 is engaged to the first gear 124, when the first gear 124 starts rotation, the second gear 125 is actuated to rotate at the same time, and the actuation shaft 126a of the generator 126 can be driven by the second gear 125 to enable the generator 126 to generate electric power. In this embodiment, the power generating apparatus 100 further includes a power storage module 150 electrically connected with the generator 126 of the power generating module 120, which is utilized for storing the electric power generated by the generator 126.

Referring to FIG. 3 again, when the transmission rod 111 moves downwardly, the blocking member 111c of the transmission rod 111 compresses the elastic member 130 to generate a reacting force. The transmission module 110 is then pushed to move upwardly by the reacting force of the elastic member 130. Afterward, the transmission module 110 moves downwardly via gravity. Therefore, the transmission module 110 can be reciprocally movable within the case 140. In this invention, the elastic member 130 can be compressed by the transmission module 110 to generate a reacting force so as to make the transmission module 110 reciprocally movable. Besides, by means of reciprocal movement of the transmission module 110, the power generating module 120 can generate electric power for raising the effectiveness of the power generation, and the electric power generated from the power generating module 120 can be stored in the power storage module 150.

Figure 4:
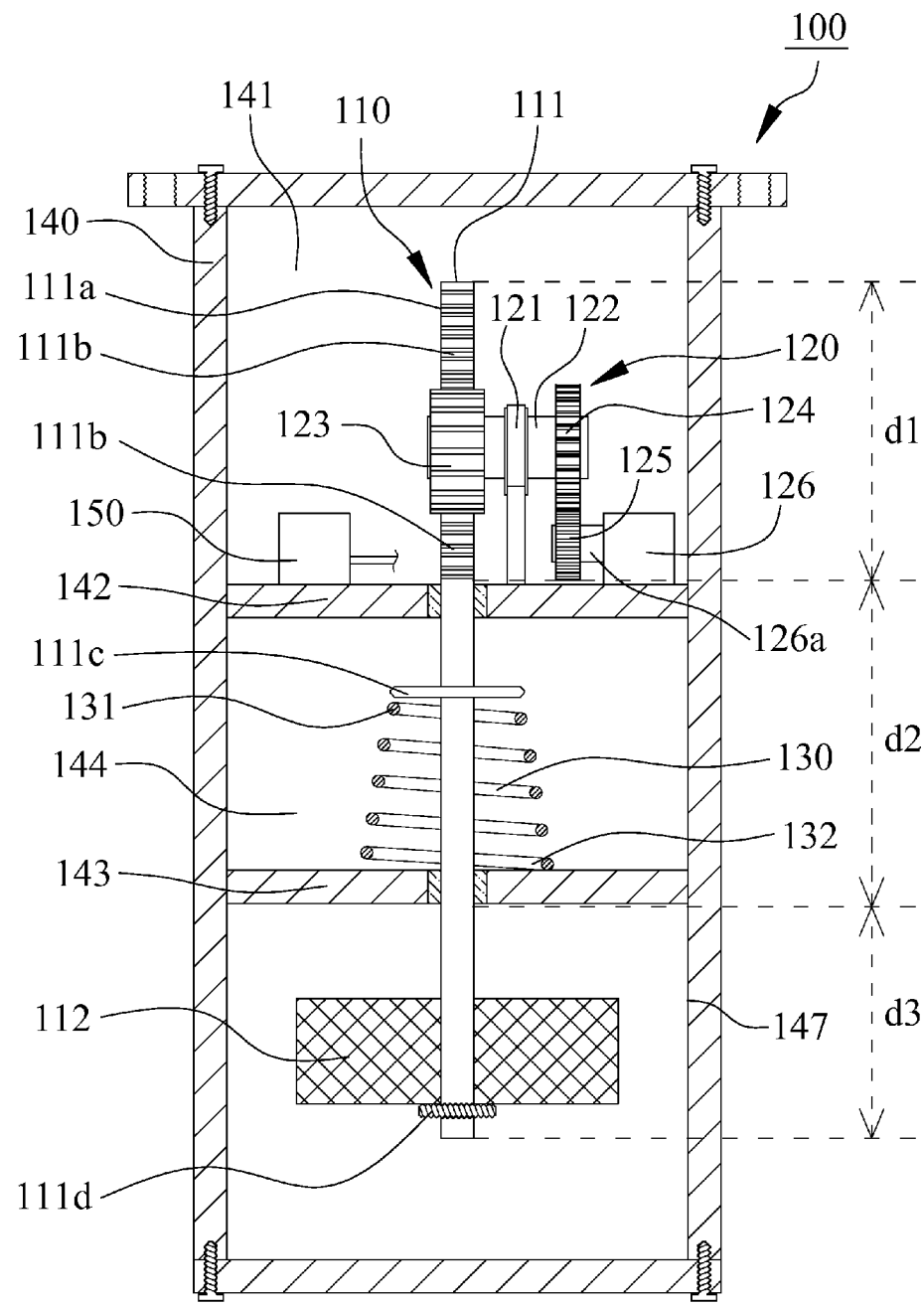
FIG. 4 is a section view illustrating the power generating apparatus with a second embodiment of the present invention.

A second embodiment of the present invention is illustrated in FIG. 4. The power generating apparatus 100 includes the transmission module 110, the power generating module 120, the elastic member 130 and the case 140. The one-way rotating gear 123 and the first gear 124 are coupled to the rotation shaft 122, the second gear 125 is coupled to the actuation shaft 126a of the generator 126, the one-way rotating gear 123 is engaged with the transmission rod 111, and the second gear 125 is engaged with the first gear 124. The primary difference between the second embodiment and the first embodiment is that the first plate 142 and the second plate 143 are formed at the inner surface 147 of the case 140. When the power generating apparatus 100 vibrates from external forces, the transmission module 110 is affected to move downwardly from gravity. Meantime, the one-way rotating gear 123, the rotation shaft 122, the first gear 124, the second gear 125 and the actuation shaft 126a of the generator 126 are actuated by the transmission module 110 to start rotation to enable the generator 126 for generating electric power. When the elastic member 130 is compressed by the transmission module 110, a reacting force is generated from the elastic member 130, and the transmission module 110 is then pushed by the reacting force to move upwardly. Thereafter, the transmission module 110 moves downwardly via gravity again so that the transmission module 110 can be reciprocally movable within the case 140 for raising the effectiveness of power generation.

Figure 5:
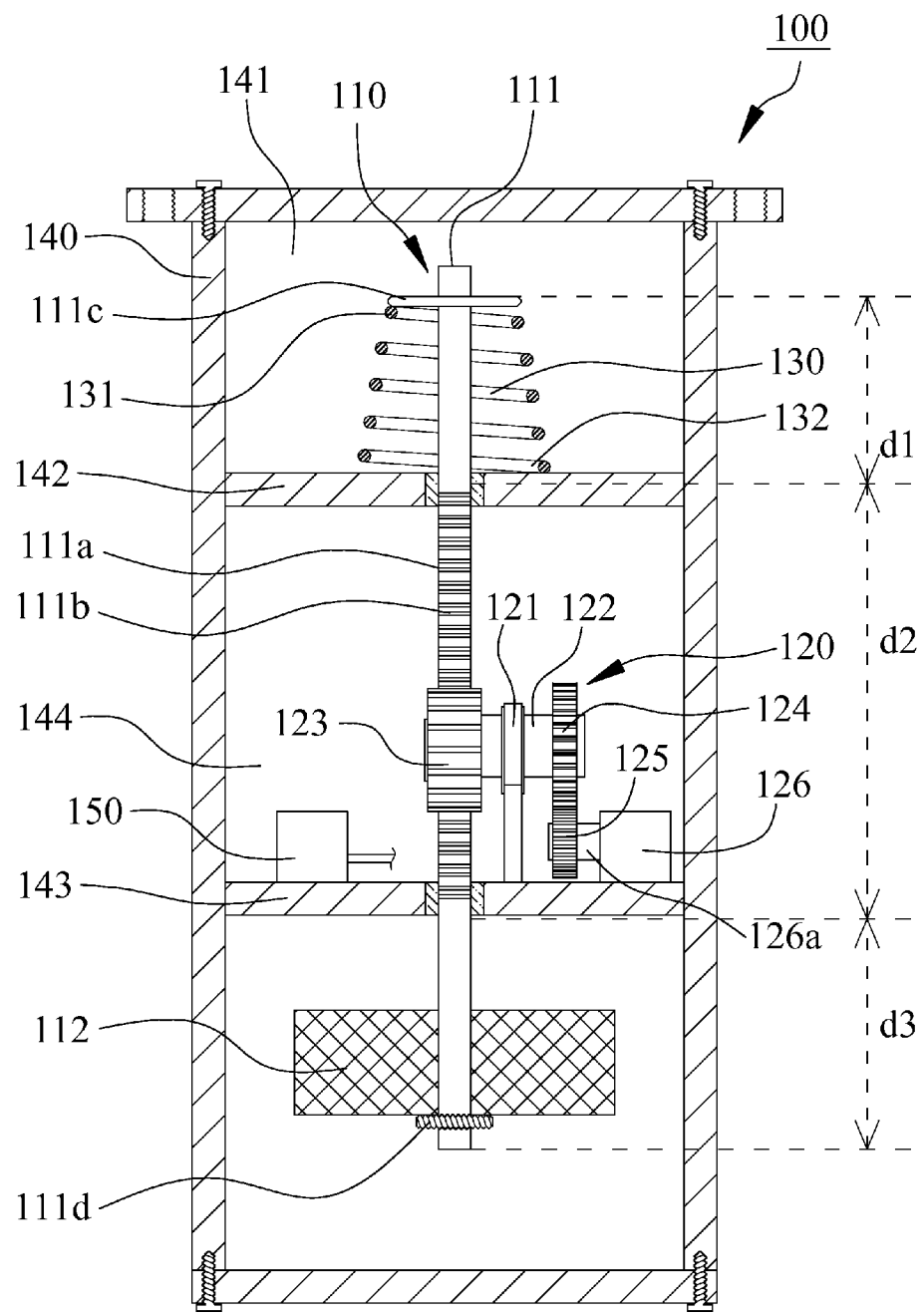
FIG. 5 is a section view illustrating the power generating apparatus in accordance with a third embodiment of the present invention.

A third embodiment of the present invention is illustrated in FIG. 5. The power generating apparatus 100 includes the transmission module 110, the power generating module 120, the elastic member 130 and the case 140. The one-way rotating gear 123 and the first gear 124 are coupled to the rotation shaft 122, the second gear 125 is coupled to the actuation shaft 126a of the generator 126, the one-way rotating gear 123 is engaged with the transmission rod 111, and the second gear 125 is engaged with the first gear 124. The primary difference between the third and the second embodiment is that the rack portion 111a is disposed at the second section d2, and the rack portion 111a is located between the first plate 142 and the second plate 143. The elastic member 130 is disposed at the first plate 142, and the second end portion 132 of the elastic member 130 is in contact against the first plate 142. The power generating module 120 is located between the first plate 142 and the second plate 143, and the power generating module 120 is disposed at the accommodating space 144.

Figure 6:
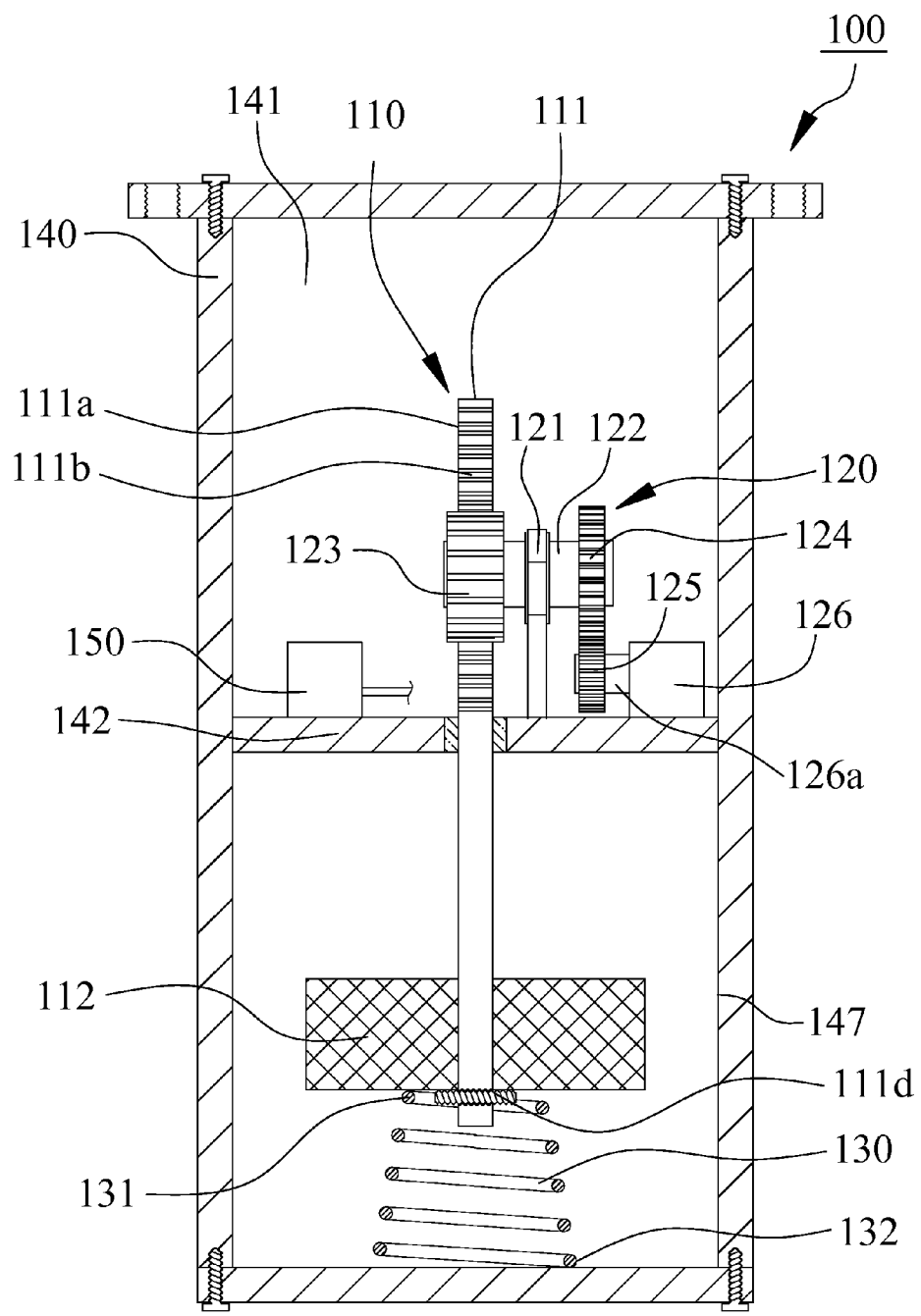
FIG. 6 is a section view illustrating the power generating apparatus in accordance with a fourth embodiment of the present invention.

A fourth embodiment of the present invention is illustrated in FIG. 6. The power generating apparatus 100 includes the transmission module 110, the power generating module 120, the elastic member 130 and the case 140. The one-way rotating gear 123 and the first gear 124 are coupled to the rotation shaft 122, the second gear 125 is coupled to the actuation shaft 126a of the generator 126, the one-way rotating gear 123 is engaged with the transmission rod 111, and the second gear 125 is engaged with the first gear 124. The primary difference between the fourth and the second embodiment is that the case 140 merely includes the first plate 142, the power generating module 120 is disposed at the first plate 142, the first end portion 131 of the elastic member 130 is in contact against the transmission module 110, and the second end portion 132 is in contact against the case 140. In this embodiment, the first end portion 131 of the elastic member 130 is in contact against the transmission rod 111 of the transmission module 110. Or, in another embodiment, the first end portion 131 of the elastic member 130 is in contact against the limiting member hid of the transmission rod 111. Or, in another embodiment, the first end portion 131 of the elastic member 130 is in contact against the counterweight block 112 of the transmission module 110.

Figure 7:
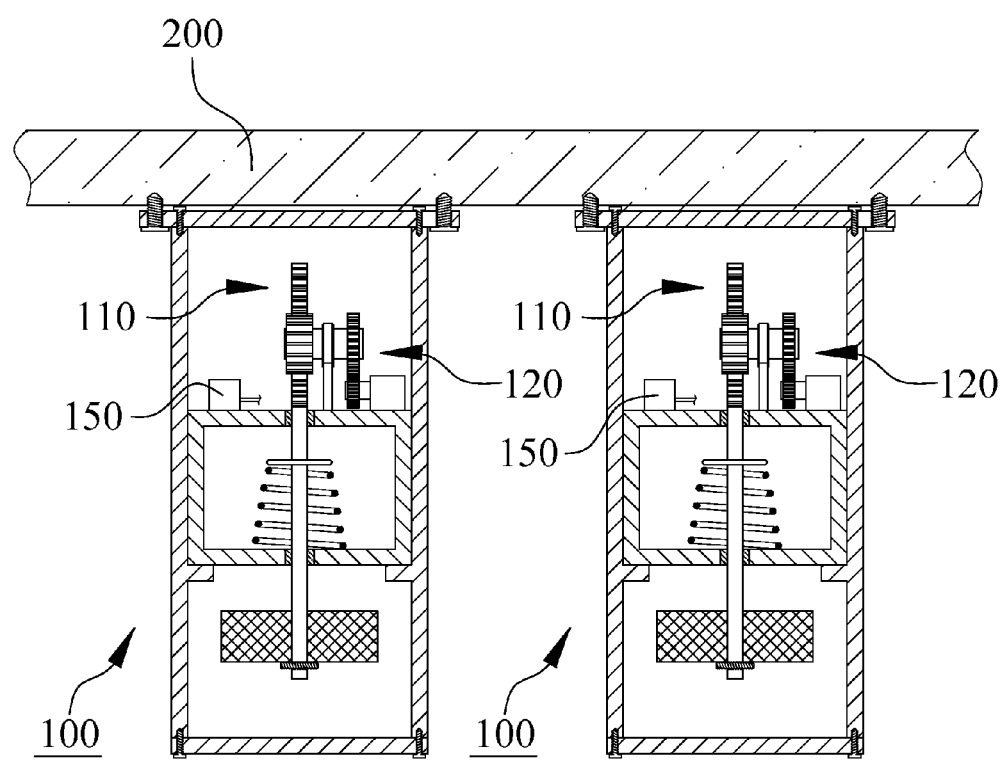
FIG. 7 is a schematic diagram illustrating the power generating apparatus being installed at a float body in accordance with a first embodiment of the present invention.

Referring to FIG. 7, the power generating apparatus 100 in this invention is capable of being installed at a float 200. When the float 200 is disposed on the sea surface, the wave motions enable the float 200 to vibrate up and down. Therefore, the power generating apparatus 100 installed at the float 200 vibrates up and down as well. The transmission module 110 of the power generating apparatus 100 bounces back and forth within the case 140 and actuates the power generating module 120 to generate electric power. Eventually, the electric power is stored in the power storage module 150.

In this invention, when the power generating apparatus 100 vibrates from external forces, the transmission module 110 can be bounded within the case 140 by means of gravity and reacting force of the elastic member 130 generated from the compression of the transmission module 110. The reciprocation of the transmission module 110 drives the one-way rotating gear 123, the rotation shaft 122, the first gear 124, the second gear 125 and the actuation shaft 126a of the generator 126 into rotation to enable the generator 126 to generate electric power. Besides, the electric power of the generator 126 can be stored in the power storage module 150. The present invention possesses a feature of higher effectiveness of power generation compared with prior arts.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:

1. A power generating apparatus including:
 a transmission module at least including a transmission rod and a counterweight block, wherein the counterweight block is coupled to the transmission rod;
 a power generating module including a supporting rack, a rotation shaft, a one-way rotating gear, a first gear, a second gear and a generator, wherein the rotation shaft is pivotally disposed at the supporting rack, the one-way rotating gear and the first gear are coupled to the rotation shaft, the one-way rotating gear is engaged with the transmission rod, the second gear is coupled to the generator, and the second gear is engaged with the first gear;
 an elastic member, wherein the transmission module is pushed by the elastic member; and
 a case having an accommodating chamber, wherein the transmission module, the power generating module and the elastic member are disposed in the accommodating chamber.

2. The power generating apparatus in accordance with claim 1 further includes a power storage module, wherein the power storage module is electrically connected with the generator of the power generating module.

3. The power generating apparatus in accordance with claim 1, wherein the elastic member comprises a first end portion and a second end portion, the first end portion is in contact against the transmission rod, and the second end portion is in contact against the case.

4. The power generating apparatus in accordance with claim 3, wherein the transmission rod comprises a blocking member, the first end portion of the elastic member is coupled to the blocking member.

5. The power generating apparatus in accordance with claim 3, wherein the case includes a first plate and a second plate, the first plate and the second plate are located at the accommodating chamber, the first plate and the second plate are spaced apart to form an accommodating space, the elastic member is disposed in the accommodating space, and the second end portion of the elastic member is in contact against the second plate.

6. The power generating apparatus in accordance with claim 5, wherein the case further includes a frame and a protrusion, the frame is coupled to the first plate and the second plate to form a supporting frame, and the second plate is disposed at the protrusion.

7. The power generating apparatus in accordance with claim 5, wherein the power generating module is disposed at the first plate.

8. The power generating apparatus in accordance with claim 3, wherein the case includes a first plate and a second plate, the first plate and the second plate are located at the accommodating chamber, the first plate and the second plate are spaced apart to form an accommodating space, the power generating module is disposed in the accommodating space, and the second end portion of the elastic member is in contact against the first plate.

9. The power generating apparatus in accordance with claim 8, wherein the power generating module is disposed at the second plate.

10. The power generating apparatus in accordance with claim 1, wherein the transmission rod comprises a limiting member, the limiting member bears the counterweight block.

11. The power generating apparatus in accordance with claim 1, wherein the case includes a first plate, the power generating module is disposed at the first plate, the elastic member comprises a first end portion and a second end portion, the first end portion is in contact against the transmission module, and the second end portion is in contact against the case.

12. The power generating apparatus in accordance with claim 11, wherein the first end portion of the elastic member is in contact against the transmission rod of the transmission module.

13. The power generating apparatus in accordance with claim 12, wherein the transmission rod comprises a limiting member, the limiting member bears the counterweight block, and the first end portion is in contact against the limiting member of the transmission rod.

14. The power generating apparatus in accordance with claim 11, wherein the first end portion is in contact against the counterweight block of the transmission module.

15. The power generating apparatus in accordance with claim 1, wherein the transmission rod comprises a rack portion having a plurality of teeth, the teeth are engaged with the one-way rotating gear.

16. The power generating apparatus in accordance with claim 15, wherein the transmission rod comprises a first section, a second section and a third section, and the second section is located between the first section and the third section.

17. The power generating apparatus in accordance with claim 16, wherein the rack portion is disposed at the first section, the case includes a first plate, and the rack portion is located on top of the first plate.

18. The power generating apparatus in accordance with claim 16, wherein the rack portion is disposed at the second section, the case includes a first plate and a second plate, and the rack portion is located between the first plate and the second plate.

19. The power generating apparatus in accordance with claim 1, wherein the counterweight block and the transmission rod are formed as one piece.

20. A power generating apparatus including:
- a transmission module at least including a transmission rod;
- a power generating module including a supporting rack, a rotation shaft, a one-way rotating gear, a first gear, a second gear and a generator, wherein the rotation shaft is pivotally disposed at the supporting rack, the one-way rotating gear and the first gear are coupled to the rotation shaft, the one-way rotating gear is engaged with the transmission rod, the second gear is coupled to the generator, and the second gear is engaged with the first gear; and
- an elastic member, wherein the transmission module is pushed by the elastic member.

21. The power generating apparatus in accordance with claim 20 further includes a power storage module electrically connected with the generator of the power generating module.

22. The power generating apparatus in accordance with claim 20, wherein the transmission rod comprises a blocking member, a first end portion of the elastic member is coupled to the blocking member.

23. The power generating apparatus in accordance with claim 20, wherein the elastic member is in contact against the transmission rod of the transmission module.

24. The power generating apparatus in accordance with claim 23, wherein the transmission rod comprises a limiting member, the elastic member is in contact against the limiting member of the transmission rod.

25. The power generating apparatus in accordance with claim 20, wherein the transmission rod comprises a rack portion having a plurality of teeth, the teeth are engaged with the one-way rotating gear.

26. The power generating apparatus in accordance with claim 25, wherein the transmission rod comprises a first section, a second section and a third section, and the second section is located between the first section and the third section.

27. The power generating apparatus in accordance with claim 26, wherein the rack portion is disposed at the first section of the transmission rod.

28. The power generating apparatus in accordance with claim 26, wherein the rack portion is disposed at the second section of the transmission rod.

* * * * *